(12) United States Patent
Satou

(10) Patent No.: US 6,301,650 B1
(45) Date of Patent: Oct. 9, 2001

(54) CONTROL UNIT AND DATA PROCESSING SYSTEM

(75) Inventor: Tomoyoshi Satou, Ibaragi (JP)

(73) Assignee: Pacific Design, Inc., Tokyo (JP)

( * ) Notice: Subject to any disclaimer, the term of this patent is extended or adjusted under 35 U.S.C. 154(b) by 0 days.

(21) Appl. No.: 09/287,565

(22) Filed: Apr. 6, 1999

(30) Foreign Application Priority Data

Oct. 29, 1998 (JP) .................................................. 10-308673

(51) Int. Cl.$^7$ .............................. G06F 15/16; G06F 9/30; G06F 9/44
(52) U.S. Cl. .................................. 712/35; 712/34; 712/36; 712/205; 712/213; 711/147; 711/150
(58) Field of Search ................................... 712/35, 40, 5, 712/38, 227, 34, 36, 205, 214, 208, 306, 206, 225, 261, 207, 32, 215, 42, 213, 211; 711/147, 149, 150, 148

(56) References Cited

U.S. PATENT DOCUMENTS 5,450,553 * 9/1995 Kitagaki et al. ...................... 712/214
5,487,173 * 1/1996 Greiss et al. ............................ 712/35

* cited by examiner

*Primary Examiner*—Daniel H. Pan
(74) *Attorney, Agent, or Firm*—Burns, Doane, Swecker & Mathis, L.L.P.

(57) ABSTRACT

The control unit of this invention has a microcode control system or systems for special purpose circuit suitable for specific data processing and a microcode control system for general purpose separately. In addition, the control unit has a fetch unit common for the above control systems. Therefore, in the data processing system having the control unit of this invention, the general purpose process and the process using the special purpose circuit, which is different from the general purpose process, are multiply executed, and synchronizing of this multiprocessing is solved in a instruction level.

22 Claims, 6 Drawing Sheets

CONTROL UNIT AND DATA PROCESSING SYSTEM

BACKGROUND OF INVENTION

1. Technical Field

The present invention relates to a control unit controlled by a microcode, and more particularly, to a control unit suitable for a data processing system requiring the real time processing such as a telecommunication unit, decode and/or encode unit.

2. Description of the Related Art

Conventionally, a system requiring high-speed processing such as decode and/or encode device for the image data is realized by a special purpose circuit (hard wired or wired logic). A system for processing a data stream standardized by MPEG1 (for game applications and others having many scene changes) or MPEG2 also strongly requires the real time processing and it has been usually realized by a special purpose circuit specifically designed and constructed.

On the other hand, many general purpose data processing systems generally use a microprocessor (MPU) or a digital signal processor (DSP). These processors having the arithmetic functions to be used for general purpose processing are not suitable for the applications in which a process to be performed in one clock is one of the greatest concern. If these processors are to be used especially in the fields requiring high-speed processing as the above, an expensive MPU and/or DSP having a guarantee of high-speed demands is required and it shall be operated in a very high-frequency condition. Even in such system, some temporal tolerance of a system level and/or an application level is still required for preventing serious timing critical path. Actually, therefore, a high-speed data processing system using MPU or DSP is difficult in view of both the cost and the technology of implementation.

With the recent progress of the semiconductor processing techniques, the applicability of the MPU or DSP in high-speed operation has come to wider. Nevertheless, the use of these devices has not yet diversified so much in the fields of application such as decoding/encoding processes requiring both a high fundamental operating frequency and one process per clock exactly.

It is therefore still common practice to realize a data processing system with a special purpose circuit in the data processing applications where high-speed operation is required and the fundamental operating frequency is higher than some degree. However, the data processing system realized with a special purpose circuit has a difficulty of meeting the requirement of specification change or expansion since those circuit and/or system are designed specifically. Therefore, to meet the specification change, redesigning or changing the architecture is usually performed. The data processing system using a special purpose circuit harbors the serious problem of a high development cost including the lead-time and a high production cost.

In spite of the solution using a processor containing the arithmetic functions, the use of a downloadable microcode (microprogram) can increase the processing speed. Also, in this system, namely in a control unit operated by the microcode, changing the program can accommodate the specification change and expansion.

However, when executing a plurality of real-time processes normally required for decoding, an attempt to realize such real-time processing with microcode gives rise to the need of switching a plurality of microprograms. Employing a method for selecting a plurality of memories storing microcode by a selector, selectors or the like depending on the need can shorten this switching time. This method, though effective in view of high-speed processing, loses its attractiveness with the increase in the types and the number of the real time processes. In other words, a multiplicity of memories corresponding to the type and the number of the processes are required, and so are a great number of selectors for switching the memories accordingly. An attempt to implement such an enormous architecture actually encounters the problems in terms of both the operating frequency and the circuit size. Further, processes which may have common elements cannot be multiplexed, resulting in an uneconomical system floated with many wasteful microcodes.

A method for attaining an economical one may consist of a step determining the factors of a process required for a program using the microcode, and a step reloading the microcode as required for the particular process. This method, however, consumes the time for the processes of starting the program, such as for judgment, saving and loading, and reduces the responsiveness of the system. This method, thus, fails to attain the object of the system, i.e. real time response, which cannot be accepted.

An another method can be proposed. In this method, the special processes executed usually performed in special purpose circuits are microprogrammed in appropriated program units. During the microprogram of the special purpose is executed, whenever the need of an error handling process or a general purpose process such as communication arises, an interrupt request is issued and the microprograms are switched in response to the interrupt request. This method still poses the problem of the responsiveness. Specifically, upon occurrence of an interrupt from an external source during the execution of a special purpose process associated with a special purpose circuit, the instruction under execution is required to be suspended or it is necessary to wait until the end of the execution of the instruction. For suspending the instruction, the register state on that occasion must be stored. In spite of the fact the process requiring a real time response is going on, the saving or loading in the register results in an overhead of at least several clocks. On the other hand, waiting until the end of the execution of the instruction means the delay of the timing for processing a required general purpose instruction.

Providing a plurality of processing units corresponding to the units of microprogram solves this problem. However, the need of providing a plurality of processing units having a similar structure increases the circuit size. Further, additional circuits and instructions are required for synchronizing the processes performed in a plurality of the processing units. A plurality of processing units almost equivalent to the processors having arithmetic units are required. In addition, the microprogram shall be changed for the parallel processing. Thus, this method is also uneconomical in view of circuit size and program development.

An another method may be provided. In this method, in stead of a plurality of microprogram processing units mentioned above, a special purpose circuit or circuits are provided in addition to a microprogram processing unit and the circuits are controlled by microcode instruction. However, the special purpose circuits are controlled by a combination program including microcode instruction for general purpose processing, a concurrent and/or parallel processing of an interrupt or other instruction cannot be executed, but the load/store operation is executed using the register, resulting in a considerable overhead. Therefore, it is difficult to realize a real-time high-speed processing.

As described above, a control unit using a microcode is capable of executing relatively high-speed and flexible processing and therefore it is a prospective data processing method or system for real time processing. Nevertheless, a substantially complete architecture capable of handling the real time process has not been proposed yet.

Further, it is necessary to point out several microcode problems as a prerequisite to the present invention. In the conventional control operation using the microcode, a fixed-length instruction has been long in use for the apparent reason of simple control operation. This is an important factor for improving the processing speed, but is not considered a satisfactory choice in view of code efficiency. In fact, traditionally a larger data processing system such as a microprocessor having the arithmetic function has also employed the variable-length instruction in view of the code efficiency. The variable-length instruction, though a satisfactory choice for its high code efficiency, has been avoided in microprocessor applications requiring high-speed processing because of the need of a complicated prefetch control for improving the throughput of the processor and the need of additional instruction code queues.

It is well known that branch instruction, conditional instructions, subroutine call, return, branch to and return from an interrupt process request service, stack processing, etc. are preferably supported at instruction level so as to improve the microcode programming efficiency. However, these processes, which consume several clocks, cannot be easily adapted to the real time processing in which the control operation shall be performed in units of a clock. Hence, those instructions have so far been considered nothing but a factor for increasing the overhead. In other words, to seek for a high-speed response by microcode control has been incompatible with the employment of the branch instructions, call/return instructions (including the return instructions from the interrupt process other than the return from a subroutine) intended to improve the productivity of the microcode programming.

In the super-pipelined technique or the super-scalar technique currently employed in the high-performance microprocessors, the overhead problem due to the return process is alleviated to some extent, though in terms of the average frequency of instruction execution, by improving the operating frequency or the throughput of the data processing. These technologies, however, have not essentially solved the penalty for a branch call, a subroutine call or an interrupt. In other words, even the currently used high-performance microprocessor is not essentially suitable as it harbors many problems in such applications as real time control which must be processed in count of a clock. The problem is not simply that of the increased circuit size and the cost effectiveness, but a more basic one depending on a considerable measure on the control and/or instruction architecture.

Accordingly, an object of the present invention is to provide a high-speed, flexible control unit and a data processing system applicable to the fields hitherto considered difficult to realize without a specifically designed system. Specifically, an object of the present invention is to provide a micro-architecture that makes it possible to execute multiprocessing or parallel processing of a special purpose microprogram or microprograms corresponding to the applications and a general data processing microprogram by a simple method.

Another object of the invention is to provide, on the basis of the micro-architecture, a control unit and a data processing system capable of multiprocessing or interrupt handling which has conventionally been considered difficult to apply in the fields requiring the real time response and control in units of a clock.

Still another object of the present invention is to provide a compact, inexpensive control unit and a data processing system capable of high-speed control by a microprogram, capable of special purpose processing for each application and capable of meeting the requirement for modification and expansion.

SUMMARY OF THE INVENTION

According to the above objects, in this invention, a control unit comprises at least one special purpose data processing unit which can decode and execute special purpose instructions to a special purpose circuit suitable for specific data processing, a general purpose data processing unit which can decode and execute general purpose instructions for performing the process other than the special purpose instructions, and a fetch unit for fetching an instruction code from a code memory (code ROM, code RAM) that stores the special purpose instructions and the general purpose instructions, both are described in microcode, and for supplying the instruction code to the special purpose data processing unit and the general purpose data processing unit. A data processing system of this invention comprises the control unit according to the above and at least one of special purpose circuits controllable by the control unit.

The control unit of this invention has a microcode control system or systems for special purpose circuit suitable for specific data processing and a microcode control system for general purpose separately. In addition, the control unit has a fetch unit common for the above control systems. Therefore, in the data processing system having the control unit of this invention, the general purpose process and the process using the special purpose circuit, which is different from the general purpose process, are multiply executed, and synchronizing of this multiprocessing is solved in a instruction level.

Namely, the control unit according to this invention has the special purpose data processing unit. Thus, the special purpose data processing such as detecting a start code from an encoded data stream, continuously decoding a variable-length coded data and the like can be executed by a special purpose circuit suitable for the particular process based on a special purpose instruction. As mentioned above, these special purpose data processing require real time operation and are more easily increased in speed by specific hardware execution.

At the same time, the provision of the general purpose data processing unit makes it possible to execute a special purpose instruction completely separately from the process based on a general purpose instruction. Thus, the process based on a general purpose instruction for meeting a response request from inside or outside of the data processing system can be executed without suspending the special purpose circuit. As a result, a general purpose instruction can be executed without sacrificing the real time operation of the special purpose circuit.

Further, the control unit has a fetch unit that is common or shared by the special purpose data processing unit and the general purpose data processing unit. Therefore, in the special purpose data processing unit and the general purpose data processing unit, the process is executed sequentially in accordance with the instruction code fetched from a common microprogram based on a common program counter.

Thus, the processing in the special purpose data processing unit and the general purpose data processing unit can be accurately controlled at the instruction code level. No telecommunication circuit for synchronizing the special purpose circuit and the general purpose data processing unit is required. Nor is the time required for the process of loading and storing data in a register which otherwise is consumed for the synchronization. Accordingly no overhead is generated for multiprocessing, requiring no increase in the circuit size. Further, no need to develop separate programs for sync control of the special purpose circuit and the general purpose data processing system can be economical.

In addition, in the data processing system of this invention, the requirement for a specification change or expansion can be flexibly met by changing the microprogram used for controlling both the special purpose data processing unit and the general purpose data processing unit.

Further, the process for the special purpose circuit is executed according to a special purpose instruction, and the particular special purpose instruction is fetched at the same level as a general purpose instruction. As a result, the overhead for loading and storing an instruction for the special purpose circuit in a register can be eliminated, which cannot be avoided in the architecture for activating the special purpose circuit through a conventional microcode processing system. Therefore, there occurs virtually no time lag for the synchronous control between the special purpose circuit and the general purpose data processing unit.

As described above, the control unit according to this invention has an architecture in which a microprogram or microprograms for special purpose having microcodes for controlling special purpose circuits (special purpose instruction) and a microprogram for general purpose having microcodes for general purpose data processing (general purpose instruction) can be handled by a single fetch unit. Thus, the control unit can easily realize the multiprocessing with several common and/or special modules. In the data processing system according to this invention having the control unit, therefore, the processing of a special purpose circuit requiring the real time operation in count of a clock can be continued while at the same time executing a multiprocessing, an interrupt processing and another special purpose instructions for another special purpose circuits. Also, at the same time, it is possible to execute a general purpose instruction in parallel with a special purpose instruction. Further, the whole unit can be provided in a more compact form at a lower cost.

The instruction code fetched by the fetch unit is a special purpose instruction or a general purpose instruction. They may be discriminated by the decoders of the special purpose data processing unit and the general purpose data processing unit what operation directed in each instruction code. However, such discrimination causes the decoding delay and unifies the instruction system, and therefore is not desirable if only to secure the expandability. Therefore, it is preferable that the instruction code includes identifier code for identifying a special purpose instruction, a general purpose instruction, and a given special purpose instruction issued to a specific one of a plurality of said special purpose data processing units, if any. By the identifier code, minimizing the decoding delay and facilitating the addition and expansion of a special purpose instruction. Further, the fetch unit preferably includes an execution control unit for decoding the identifier code and directing the general purpose data processing unit or any one of the special purpose data processing units to decode and execute the instruction code.

By a process of decoding the identifier code and directing said general purpose data processing unit or any one of said special purpose data processing units to perform decode and execution of the fetched instruction code, it makes possible to eliminate the process for storing and loading the unfavorable instruction code in a register. In addition, it prevents the generation of a critical path on the circuit which otherwise might be caused by the process of decoding the unfavorable instruction code in the special purpose data processing unit and the general purpose data processing unit.

It may be possible to employ a method in which an instruction code is decoded in the special purpose data processing unit or the general purpose data processing unit then judged whether or not the processes in the special purpose data processing unit and the general purpose data processing unit can be executed in parallel. This judgment process requires increased hardware, which in turn causes a new critical path, thereby adversely affecting the operating frequency.

These problems are avoided by providing a parallel processing flag for expressly indicating which of the special purpose data processing units is to execute the succeeding one of the instruction codes or whether the parallel processing is possible in the general purpose data processing unit. The provision of the parallel processing flag, and a process of directing any one of said special purpose data processing units or said general purpose data processing unit to decode and execute the succeeding instruction code based on the parallel processing flag of the instruction code, it eliminates the need of the processing for judging whether or not the parallel processing (multiprocessing) is possible, and thus can prevent the overhead otherwise might result.

Further, it is preferable that the control unit further comprises execution register for at least any one of said special purpose data processing units or said general purpose data processing unit and the fetch unit to include a fetch data (instruction code) output unit for storing the instruction code in the execution register while at the same time allowing the succeeding instruction code to be fetched. It is more preferable to have the execution register for each special purpose data processing units. In addition, it is preferable to include an execution control unit for instructing any one of the special purpose data processing units or the general purpose data processing unit to decode and execute the succeeding instruction code based on the parallel processing flag of the instruction code.

A process of storing the instruction code in the execution register while at the same time fetching the succeeding code, can supply the instruction code always in one clock to the special purpose data processing units and the general purpose data processing unit. Specifically, even when the process according to the start code search instruction requiring several clocks for execution, as the data processing system of this invention, the execution in one clock and the fetch in one clock can be continued basically. Thus, the process can be accurately defined and executed in unit of one clock and therefore the multiprocessing or the interrupt processing can be controlled in parallel in response to the special purpose instruction.

The efficiency of the instruction code of the microprogram is higher if the code length (word length) is variable. However, a prefetch buffer or the like will be necessary to fetch the variable length instruction, therefore, the instruction code may not be able to be acquired efficiently. Also, in the case where the instruction code is split over two lines at the word boundary corresponding to the bus width, the instruction code cannot be loaded in one clock. When the prefetch buffer is used, on the other hand, the execution of the instruction is suspended until a new instruction is loaded in the prefetch buffer, for example, when a branch instruction occurs.

Preferably, therefore, the instruction code has an instruction length code indicating the word length of the particular instruction code, and the fetch unit includes a fetch data output unit for fetching a microcode corresponding to the maximum instruction length subsequent to the instruction code as the succeeding instruction code. It is more preferable that the fetch unit includes a fetch address output unit for outputting a two-line instruction fetch address.

By the provision of the instruction length code, it makes possible to determine the head address of the succeeding instruction code without decoding the whole instruction code (all the bits of the operation code). As a result, by a process of fetching the microcode corresponding to the maximum instruction length subsequent to the instruction code as a succeeding instruction code, the succeeding instruction code can be accurately fetched without providing the prefetch buffer. By outputting the two-line instruction fetch address, on the other hand, the instruction code can be fetched even when the instruction code extends over the word boundary. Thus, a predetermined instruction code can be always fetched in one clock by employing a variable-length instruction code with high code efficiency without using the prefetch buffer. In this way, the process can be accurately defined and executed in units of a clock or a clock basis. It, thus, becomes easier to control the parallel execution of the multiprocessing program or the program having interrupt process, these are constituted by a general purpose instruction, in response to the special purpose instruction.

As described above, the subroutine call, the call, the return or the interrupt processing function is indispensable for creating an efficient microprogram. In view of this, the fetch unit desirably includes a fetch address output unit for outputting an instruction fetch address and a fetch control unit capable of supplying the return address stored in a temporary register or registers to the fetch address output unit. Further, the general purpose data processing unit desirably includes a register management function for storing the return address in a memory (stack) and the temporary register when executing a branch instruction or an interrupt instruction, and loading the next return address from the memory into the temporary register when executing the return process. Because the next return address is loaded in the temporary register when executing the return process, it is not necessary to load the return address from the memory into the temporary register when processing the next return instruction. It, thus, becomes possible to process the return instruction in one clock, and the return-related process can also be defined and executed accurately in a unit of a clock. As a consequence, this mechanism provides a control unit based on the microcode by which the multiprocessing or the interrupt processing can be easily controlled.

Further, in the case of the interrupt process, it is preferable to allow the condition code in addition to the return address to be loaded in the register in one clock. For this purpose, the register management function has temporary registers for each of the interrupt return address and the condition code. When executing an interrupt instruction, preferably the return address and the condition code are stored in the memory, while at the same time being stored in the temporary registers for the interrupt return address and the condition code, respectively. When executing the return process, preferably the memory address of both the area of the return address and the condition code are output, and the next return address and the next condition code are loaded from the memory into the temporary registers. In this way, the return from the interrupt processing can also be accomplished in one clock.

As described above, by the control unit, the control method having the above mentioned process and the microcode being supplied by storing in a memory device or medium such as ROM, RAM and others including movable, fixed or in the network, according to this invention, the control operation accurately in a unit of a clock is provided. Further, a branch instruction, a call instruction and a return instruction can all be executed in one clock. As a result, the timing can be designed with an accurate pipelining control, and the required clock cycle is minimum (one clock) and constant regardless of whether the branching is established or not, thus allowing for the efficient control operation like the state machine without waste cycle.

This is indicative that, by this invention, the control-operation of the same type as the special purpose state machine is possible even by the microprogram having a general purpose data processing instruction capable of multiprocessing. In other words, it indicates that a transparent processing equivalent to the one that is executed by the system having independent special purpose microprograms becomes possible by the control of a general purpose microprogram exhibiting a very high code efficiency. In addition, while a high performance is attained, substantially no portions are overlapped as the circuit for realizing the control unit and the data processing system of this invention. Therefore, it leads to the compact control unit and the compact data processing system.

With the control unit using a microcode and the data processing system according to the invention, it is possible to provide an efficient, high-speed data processing system having the performance equivalent to that of the conventional data processing unit realized only with a special purpose circuit having no flexibility which will be replaced by the data processing system of this invention.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENT

Figure 1:
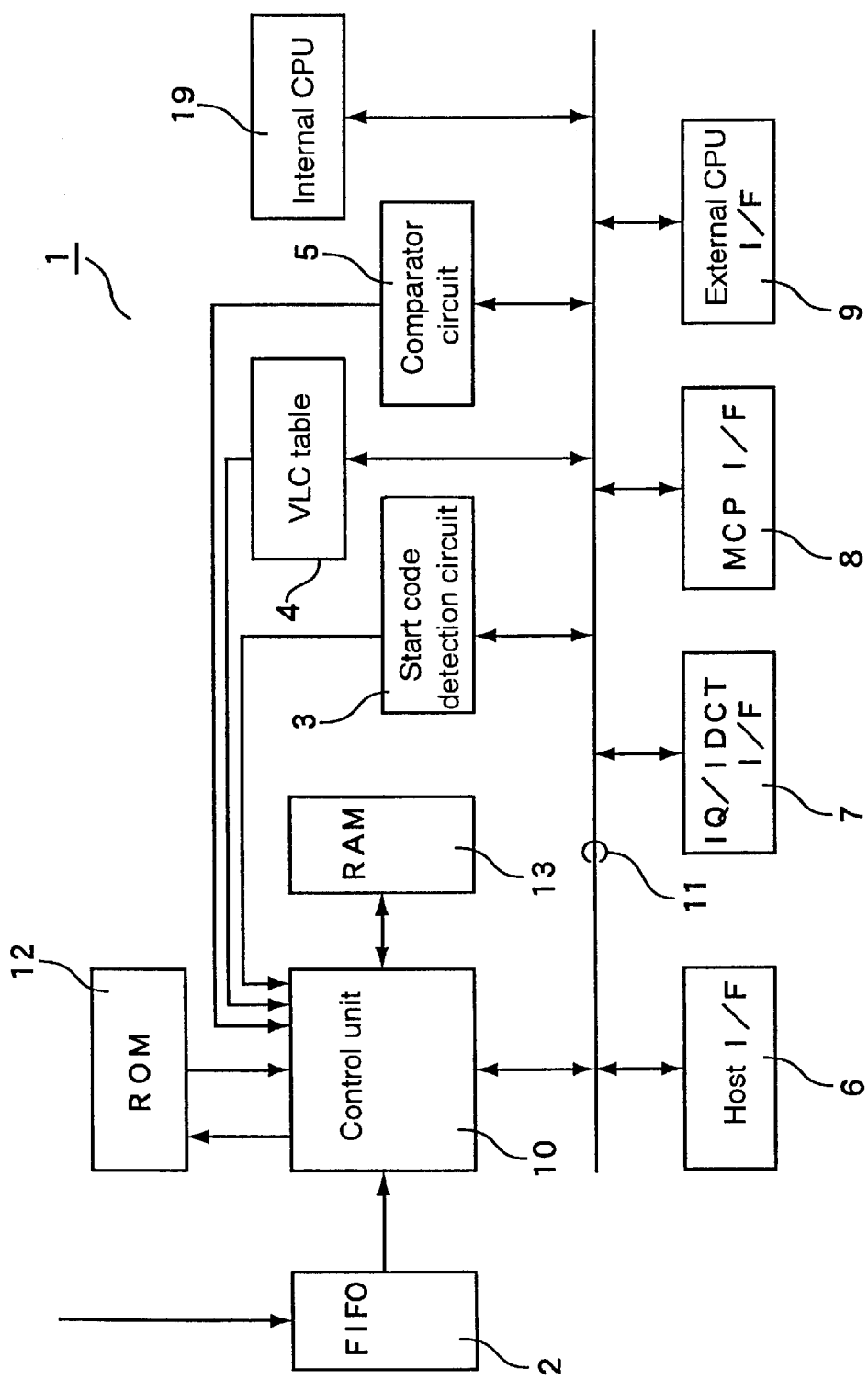
FIG. 1 is a block diagram showing a general configuration of a data processing system (VLD) for decoding the variable-length code having a control unit according to the present invention.

The present invention will be explained more detail with reference to the drawings. FIG. 1 is a block diagram showing a general configuration of a data processing system for variable-length encode and/or decode (hereinafter referred to as the VLD) having the function of decoding the variable-length code (VLC) contained in the bit stream standardized by MPEG.

The amount of the image information is larger than that of the audio information or the text information by the order of about several digits, and the processing by coding such a great amount of information is critical for realizing the multimedia. The MPEG standard is for the coded information, and the MPEG-2 currently has been increasingly employed as being adaptable to wide applications in various fields. The bit stream of MPEG-2 (MPEG bit stream) has a hierarchical structure including, from the upper layer thereof, a sequence layer, a GOP (group of picture) layer, a picture layer, a slice layer, a macroblock layer and a block layer in a descending order. Each layer from the sequence layer to the slice layer has a unique start code and these layers can be decoded by recognizing the start code. In each layer including the picture layer and below, an average information amount reduced by variable-length coding or entropy encoding which can code the vast amount of image information in a compact form. It is, thus, very important for the MPEG bit stream to decode a vast amount of VLC at a high speed, which in turn strongly requires a high-speed VLD.

The processing performance required for the VLD is dependent on how much the bit stream has to be processed per unit time. This is, in a sense, the most important factor affecting the internal architecture and can be the most important point of design trade-off. As described above, the syntax of the MPEG bit stream (video) is characterized by a unique code called the start code defining the layer, a fixed field (FLC) and a variable-length field (VLC). For this reason, the following factors greatly affect the processing performance of VLD.

(1) Processing for detecting the start code
(2) Setting each control parameter
(3) Processing for decoding VLC
(4) Detecting of MPEG syntax error
(5) Being flexible at application level (i.e., meeting the user data requirement)
(6) Being expandable such as to cope with the requirement of the upper layers First, the ability to detect the start code may be a minor factor to cause a problem in applications placing emphasis on the video reproduction if the transmission quality is very stable. On the contrary, it may be a serious factor to cause a problem in applications assuming the interactive reproduction such as the video editing work or games. In such cases, it is necessary to detect the start code of the layer required from a bit stream of a certain amount, which has a great effect on the response for reproduction. Especially when a high-quality image is involved, i.e. in the situation where the coding parameters that increase the compression ratio excessively cannot be selected, a bit stream of a correspondingly larger amount must be handled. Thus, the detection rate of the start code makes up a factor greatly affecting the operability of the VLD as viewed from a human (operator).

Secondly, the setting and storing of the control parameters may be a relatively minor factor to cause a problem in the case where the amount of the MPEG bit stream to be decoded is not so large. This process may be a serious factor, however, in the case where the amount of the bit stream to be decoded is large with little allowable time. A further problem may be caused by the processing speed in the case where there is little allowable time but many parameter accesses from the external host CPUs or the like simultaneously. Because the MPEG-2 has many types of parameters, it is not economical to keep all of them in register. This processing, if to be performed on a special purpose hardware (special purpose circuit), increases the circuit size, degrading economic efficiency. On the other hand, since the processing in the MPU consumes much time, it is difficult to execute the decoding process while keeping up with the external accesses timely.

Thirdly, the VLC decoding process has the disadvantage in that unless a given code is completely decoded, the next VLC cannot basically start decoding. Especially when the amount of the bit stream to be decoded is large, the delay in decoding may cause a fatal problem. The only solution for the aforementioned problem without increasing the circuit size is to increase the operating frequency of the circuit. However, the increased operating frequency makes the design requirement of the whole system strict, and greatly affects the lead-time and the yield of the chip. If an increased circuit size is allowed, several solutions are available, for example, by including a completely double VLC table or parallel decoding at the slice layer. These countermeasures, however, are not preferable because they directly affect the die size, leading to the increased the unit cost of the chip.

Fourthly, in the MPEG bit stream, a strict layer structure is specified. If this requirement cannot be met due to the problem of transmission quality or the like, it affects the image displayed and the whole system may fail due to the conflicts of parameters decoded. Normally, this inconvenience will be avoided by the processing such as error correction at upper layer level. Nevertheless, the decoding process itself has to be resistant to some extent to such a conflicting MPEG bit stream. The measure such as the error concealment is taken for the MPEG-2 but not satisfactory. Especially for the users of application requiring a high quality image having many bit streams to be decoded, this is a very serious problem directly affecting the product image. Thus, the function of detecting the error of the MPEG syntax is the essential requirement, and if possible, the error check function at FLC or VLC level is desirably provided.

Fifth, the MPEG-2 has fields for user data allowing for expandability at application level. The user can add the specifications for multiplexing characters and texts or animation characters using these fields at the application level. Therefore, it is preferable to create a hardware configuration that can meet the future requirement of expansion.

Finally, with the increased degree of integration of the semiconductor, the future integration may come to include the decoding function at the upper layer. Therefore, it is preferable to create the architecture that can meet such a requirement. A high economic efficiency will be achieved if the basic unit and/or the expanding of the special purpose unit can meet the requirements for synchronization with error correction, encryption and audio signal.

The variable-length decoder VLD 1 according to this embodiment is a data processing device configured to satisfy the various performance requirements described above as well as the economic aspect thereof, and can decode the variable-length code at a high speed.

The data processing device VLD 1 of the embodiment shown in FIG. 1 has an input FIFO 2 for receiving a bit stream, a control unit 10 of microcode type including a function as a barrel shifter, a start code detection circuit 3 constituting one of special purpose circuit for detecting the start code from the bit stream, a VLC table 4 constituting an another special purpose circuit for decoding the VLC, a comparison circuit 5 constituting a special purpose circuit for comparing bit patterns sequentially to search for an arbitrary pattern in the bit stream at high speed, a host interface 6, an IQ/IDCT interface 7, an MCP interface 8, an external CPU interface 9 and an internal CPU 19 to establish communication for realizing a software interface with the external CPU. These component parts are connected to each other by a bus 11. The control unit 10 is connected with a ROM 12 for storing microcode and a work RAM 13 constituting a work area.

The bit stream can be input either directly from an external source or input after being buffered in an external memory. As long as the conditions for designing the external memory interface are not tight and a high response to the bit stream supplied can be guaranteed, the size of the internal FIFO may be small. In such a case, the circuit size becomes reduced sufficiently. Conversely, the large internal FIFO 2 will meet a tight architecture in which the external memory has an insufficient band width, or the required minimum band width is secured by increasing the switching time based on bus arbitration, i.e. by increasing the latency to some extent. Thus the size of the internal FIFO depends on the grade of the response of the input data or the latency. Even if a large-capacity FIFO or the like device cannot be implemented at the library level, the same function may be realized using a single port RAM. To the extent that the failure affecting the whole process is prevented, serious problem will not occur in most cases, if the conditions of the input bit stream are considerably inferior.

The control unit 10 includes the intelligent barrel shifter directly controllable by the internal CPU. The configuration of this control unit will be described in more detail later. According to the microcoded program, the control unit 10 controls both the process in a special purpose circuit such as detection of a start code, detection of a specific bit pattern and decoding of VLC and FLC, and the general-purpose process such as the data storage in a specified area, the error processing and the interrupt process.

The start code detection circuit 3 operating in units of 64 bits decodes the bit shift amount that is the most suitable for detection and notifies it to the barrel shifter. In the case of MPEG video, the start code is unique, and it is sufficient to determine only the fastest shift amount for detecting the start code. The barrel shifter is of 32-bit type, which decodes the information on the register side in the barrel shifter and realizes a high-speed shift of 64 bits in maximum. Further, since the byte alignment need not be taken into consideration as a prerequisite, the risk of the start code detection failure is basically totally eliminated.

The VLC decoding table 4 is formed of a VLC decoding table used for MPEG-1 and MPEG-2, and the table select information is acquired from the control unit 10 having the function of the barrel shifter.

The host interface 6 permits to access the internal memory of the internal CPU 19, and depending on the configuration of the execution program of the internal CPU 19, data processing and decoding may be controlled though the interface 6. In such applications as games, for example, it becomes possible to repeat the scene change easily at a high speed to develop a story from one minute to another. While,these operations require fast start code detection and the decoding in fine units of a clock, the VLD according to this embodiment can execute the above-mentioned process requiring the real-time control. Therefore, the scene change operation and the like mentioned above can be realized by communication with the external CPU.

An IQ/IDCT interface 7 is an interface with an inverse quantization unit or an inverse discrete cosine transformation unit. In the case where the internal CPU 19 is a high-speed CPU like an FIPU (2-instructions/CLK), it can execute the process up to the inverse quantization and can transfer data directly to the inverse discrete cosine transformation unit.

The MCP interface 8 is for transferring such data as the macroblock address, type or motion vector information required for motion correction to an MCP (motion compensator). Depending on the MCP (motion compensator), the macroblock address can be transferred by being converted into an absolute address instead of the increment address including the escape code.

The internal CPU 19 has no specific function from view of the VLD 1 and depends to an extent of integration that the user needs. The low processing performance CPU may be enough as the CPU 19, so it is selectable from wider fields according to the applications actually realized by VLD. Where the CPU 19 with low processing performance is selected, the inverse quantization process or the like cannot be executed by software in some case and a special purpose hardware module may be required. In the case where the future expandability is stressed, on the other hand, a CPU exhibiting a certain degree of performance is desirably employed as the internal CPU to flexibly meet the change in the specification or addition thereof.

Figure 2:
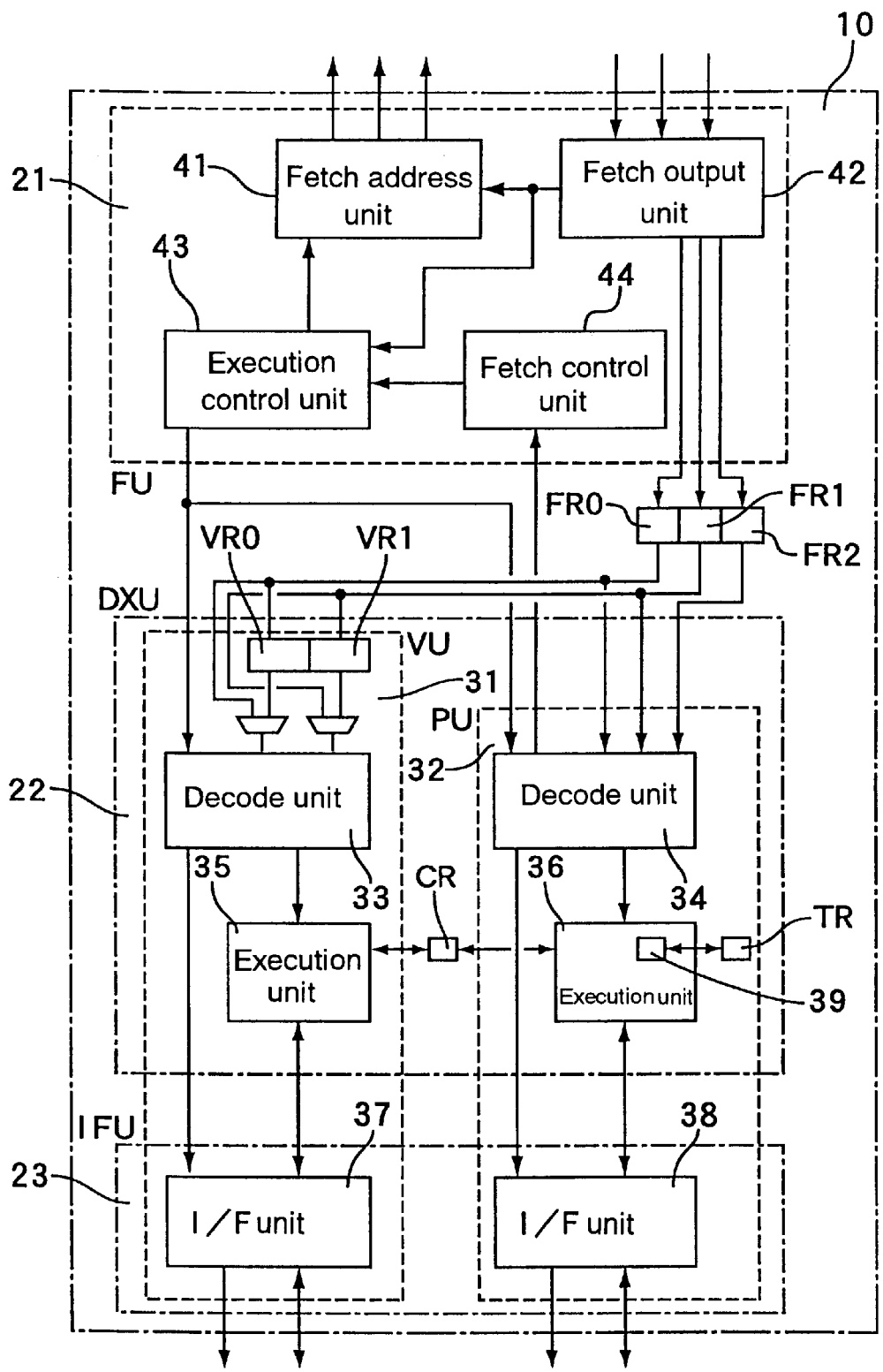
FIG. 2 is a block diagram showing a general configuration of a control unit according to this invention.

FIG. 2 is a block diagram showing a general configuration of the control unit 10 of the VLD 1. The control unit 10 in this embodiment is a control device operated by a microcode (microprogram) stored in the code ROM 12. The control unit 10 has three large blocks. The first is a fetch unit (FU) 21 for fetching an instruction code, the second is an instruction decode and execution unit (DXU) 22 for decoding and executing an instruction, and the third is an interface unit (IFU) 23 for interfacing with the external special purpose circuits or other resources through the bus 11.

The instruction decode and execution unit 22 and the interface unit 23 are functionally separated into two parts. One is a special purpose data processing unit (hereinafter referred to as VU) 31 for decoding and executing special purpose instructions processed in the special purpose circuit such as the start code detection circuit 3, and another is a general purpose data processing unit (hereinafter referred to as PU) 32 for executing the other instructions for general purpose data processing(general purpose instructions). Thus,while a special purpose instruction associated with, for example, the variable-length code/decode (VLD) process is executed in VU 31, another general purpose data process can be parallel executed by the PU 32. In order to realize the fast execution of one instruction per clock, in the control unit 10 of this embodiment, the decode cycle and the execution cycle are performed in the same phase. As a result, these modules DXU 22 and IFU 23 are shared structure for VU 31 and PU 32.

In order to constitute the VU 31 and the PU 32 having independent functions, the instruction decode execution unit 22 includes submodules of a unit (VDEX) 33 for decoding special purpose instructions and a unit (PDEX) 34 for decoding general purpose instructions. Further, the DXU 22 includes submodules of a unit (VDR) 35 for executing the decoded special purpose instructions, and a unit (PDR) 36 for executing the decoded general purpose instructions. The interface unit 23 has submodules of subunits 37 and 38 which are included in VU 31 and PU 32 respectively and accessible to the bus 11. In this way, the VU 31 includes the individual decode unit 33, the execution unit 35 and the interface unit 37. Likewise the PU 32 includes the individual decode unit 34, the execution unit 36 and the interface unit 38. Thus, the VU 31 and the PU 32 can decode and execute instructions independently. In this embodiment, however, the parallel operation will not start unless the parallel process instruction is written in the program.

This control unit 10 has at least one register CR that can be commonly accessible from both the VU 31 and the PU 32. By the register CR, the VU 31 and PU 32 can exchange data each other at register level. As a result, various data processing can be flexibly performed by combining special purpose instructions and general purpose instructions. Further, although a single unit of the VU 31 is provided in FIG. 2, a control unit for a processing system capable of multiprocessing operation using different special purpose circuits can include a plurality of VUs. In such control unit, it is possible to apply the similar architecture and processing as described in this specification.

The fetch unit 21 for fetching the instruction codes to the VU 31 and the PU 32 includes four units. That are a fetch address output unit (VFAU) 41 for outputting instruction fetch address to the code ROM 12, a fetch data output unit (VFRU) 42 for fetching the instruction code from the code ROM 12 and outputting the instruction code to fetch registers FR0, FR1 and FR2, an execution control unit (VPFDC) 43 for controlling the fetch and the execution of decode of the instruction, and a fetch control unit (VPIRQ) 44 for controlling the interrupt, the exceptional process, the fetch from the reset state and the fetch after execution of a return instruction. The instruction code for this control unit uses an instruction set simplified for raising the upper limit of the operating frequency. In addition, the instruction code has the field arrangement that the internal control of the fetch unit 21 can be accomplished simply by decoding the first several bits of the instruction code.

Figure 3:
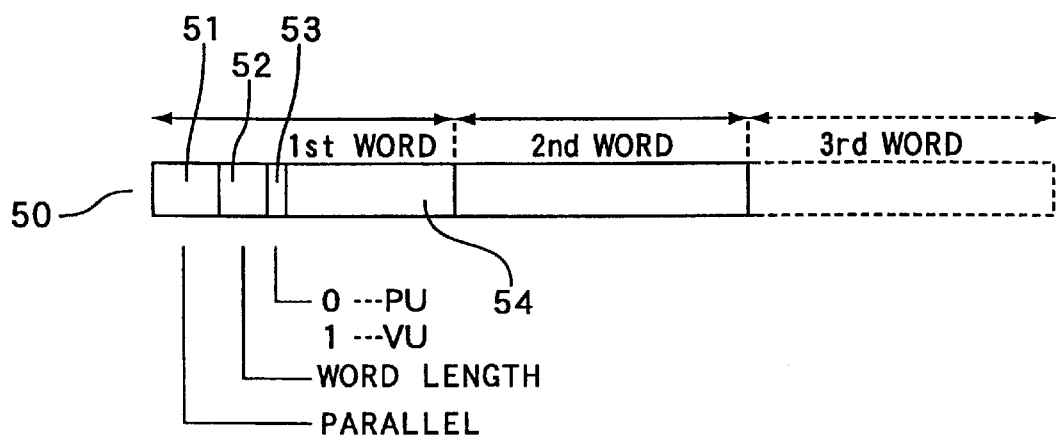
FIG. 3 is a diagram showing a structure of the instruction code for the control unit shown in FIG. 2.

FIG. 3 shows a structure or organization of the microcode used in the control unit 10. In this embodiment, microcode structure with a maximum length of 3 words each having 16 bits is employed as an instruction code 50. The head of the instruction code 50 is the field of the parallel processing flag 51 of one or several bits indicating whether or not the succeeding instruction code can be processed in parallel with this instruction code 50. This field is followed by a field of a code for instruction length 52 of one or several bits indicating the word length of the instruction code 50. The field of the instruction length code 52 is further followed by a field of an ID (identifier) code 53 of one or several bits indicating the destination of the instruction code 50. Subsequent to these fields, a field 54 is provided for the contents to be processed including operands and parameters. In the control unit 10 according to this embodiment, a variable-length instruction code is employed such that 2-word and 3-word instruction codes coexist depending on the length of the operands and parameters.

More detail, first, the ID code 53 is the data indicating whether the instruction code 50 is a general purpose instruction decoded and processed by the PU 32, or a special purpose instruction decoded and processed by the VU 31. In this embodiment, the ID code 53 is set to "0" for the general purpose instruction, and the ID code 53 is set to "1" for the special purpose instruction. Further in the case where a plurality of VU systems are available, the specific VU system of decode and processing can be discriminated by setting an ID code indicating the particular VU system appropriately.

This ID code 53 is decoded in the execution control unit 43 of the fetch unit 21, and direction as to decode is issued to the decode unit 33 of the VU 31 or the unit 34 of the PU 32. According to the direction, the decode unit 33 or 34 decodes the instruction code loaded in the fetch registers FR0 to FR3. Thus, the VU 31 or the PU 32 decodes and executes only a special purpose instruction or only a general purpose instruction respectively. Therefore, the time is not consumed for decoding other instructions, thereby preventing the decoding delay which otherwise might be caused. Also, since the VU and the PU decodes and executes the special purpose instruction or the general purpose instruction alone respectively, the contents to be processed in each processing unit can be described specifically in units of a clock or a clock basis and actually can be so controlled.

The instruction length code 52 indicates the word length of each instruction code 50, and in this embodiment, is used for indicating whether the instruction code contains 2 or 3 words in length. In the fetch unit 21, when the instruction length code 52 is decoded in the fetch address output unit 41, the head address of the succeeding instruction code is determined without decoding the whole instruction code. Thus, the succeeding instruction code can be always fetched without decoding the instruction code 50 in the VU 31 or the PU 32. Consequently, the fetched instruction code is always stored in the fetch registers FR0 to FR2 at the next clock timing, and a fetch cycle in a unit of a clock can be performed. Further, the prefetch control and the prefetch buffer for fetching the variable-length instruction code will be no longer required.

The parallel processing flag 51 is the data indicating that the succeeding instruction code can be multiprocessed. In the case where this code 51 indicates possibility of the multiprocessing, the fetch data output unit 42 of the fetch unit 21 fetches the next instruction code and stores it in the registers FR0 to FR2 without waiting the decode process of the instruction code in the VU 31 or the PU 32. Then, the execution control unit 43 directs the PU 32 or the VU 31 to decode and execute the instruction code according to the ID code 53. In this way, the possibility of multiprocessing can be expressly indicated at the instruction code level, and the multiprocessing control is possible in units of a clock. Also, the possibility of multiprocessing is not determined in the decode unit 33 or 34 of the VU 31 or the PU 32 based on the mutual processing condition. Thus, it is possible to prevent enlargement of the circuit size in the hardware for the determination which otherwise might be caused by the overhead due to the multiprocessing and the occurrence of a critical path on the circuit.

As described above, by arranging the parallel processing flag 51, the instruction length code 52 and the ID code 53 at the head of the instruction code 50, the fetch unit 21 can perform the internal control simply by decoding the head of the instruction code, for example, the code stored in the fetch register FR0.

In this embodiment, as explained, whether or not the general purpose instruction can be multiprocessed is described in the previous special purpose instruction code. Therefore, where the instruction code stored in the fetch registers FR0 to FR2 is a special purpose instruction and its parallel processing flag 51 shows multiprocessing is possible, this special purpose instruction code is decoded by the decode unit 33 of the VU 31 and stored in the execution registers VRO and VR1 at the same time. Namely, in this embodiment, a 2-word instruction code is prepared as the special purpose instruction and it can be stored in the 2-word execution registers VR0 and VR1. The special purpose instruction is stored in the fetch registers FR0 to FR2 while at the same time the instruction length code 52 is decoded by the fetch address output unit 41. Therefore, the program counter (instruction counter) IP advances to the head of the succeeding instruction code and the succeeding one is fetched. Thus, when the special purpose instruction is stored in the execution registers VR0 and VR1, actually at the timing of the rise or fall of the next clock cycle, the succeeding instruction code is stored in the fetch registers FR0 to FR2. Then, the particular instruction code (general purpose instruction) is decoded by the decode unit 34 of the PU 32 and the process based on the general purpose instruction is executed in parallel with the process based on the special purpose instruction.

In the process, the program counter IP further advances to the head of the succeeding instruction code and it is fetched. The succeeding instruction code is stored in the fetch register as soon as the instruction code stored in the fetch registers FR0 to FR2 are consumed. In this way, the fetch cycle is repeated in units of a clock in the control unit 10. In addition, since the execution registers VR0 and VR1 are prepared for the special purpose data processing unit VU, the special purpose instruction can be a resident instruction of VU till the execution of the special purpose circuit ends. It is preferable to prepare the execution register or registers VR for each VU if a plurality VU's are required for a plurality of special purpose circuits.

Further, a common fetch unit 21 is prepared for the VU 31 and the PU 32, therefore the VU 31 and the Pu 32 are controlled by the instruction code fetched by the single fetch unit 21. Thus, the process of the VU 31 and the PU 32 including the multiprocessing can be controlled strictly in units of a clock at the instruction code level. As a result, the synchronizing control of the VU 31 and the PU 32 can be directed by the programming, and no communication circuit for multiprocessing nor the processing time for arbitration is required by the VU 31 and the PU 32. In addition, since the VU 31 and the PU 32 are controlled by a common microprogram, changing the program will flexibly accommodate a specification change or expansion.

Also, since the special purpose instruction for controlling the VU 31 are microcode in itself, it becomes possible to eliminate the control overhead in the load/store operation of the register which otherwise could not be avoided for controlling the special purpose circuit by way of the microcode. As a result, the VU 31 and the PU 32 can be processed in parallel in exact synchronism with no time lag.

The factors (1) to (6) greatly affecting the processing performance of the VLD as a data processing system for processing the MPEG bit stream, as aforementioned, constitute a trade-off relationship between seeking the high speed processability with a special purpose circuit and seeking the general purpose processability using the processor operated according to a microcode or a larger program. In the control unit 10 and the VLD (the data processing system) 1 using it, by contrast, the special purpose circuit and the general purpose processing system are adapted for multiprocessing with a very simple configuration. As a result, in this invention, the factors (1) to (6) described above, instead of constituting a design trade-off relationship, can be accommodated in a very smart form having both the high speed characteristic of the special purpose circuit and the general purpose applicability like the processor. In addition, the circuit size is almost kept unchanged and the time and cost consumed for the circuit design or the program development can be reduced so much. Consequently, it is possible to provide a high-speed VLD that is both compact and has a high cost advantage.

In order to realize a control unit with a microcode having further high real time operability by further strict control in the data processing system 1, it is important that substantially all the control steps can be performed within one clock. For this, the control unit 10 according to this embodiment has the following functions.

Figure 4:
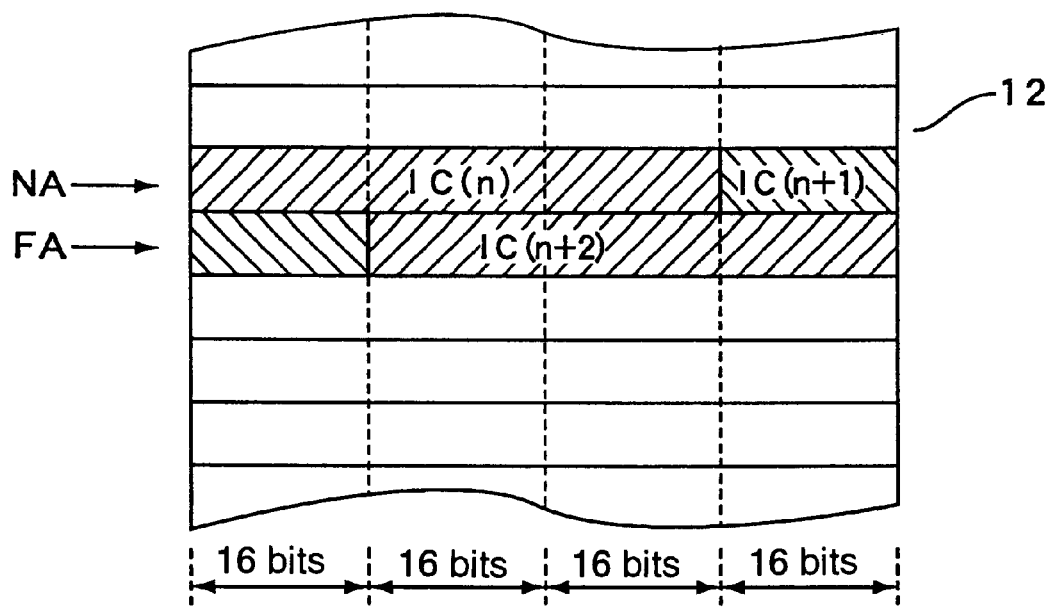
FIG. 4 is a diagram showing a model of the manner in which the instruction code is stored in the code ROM.

The control unit 10 according to this embodiment employs a variable-length instruction format for improving the microcode efficiency. Thus, as shown in FIG. 4, in the variable-length instruction format, a variable instruction length is consumed by the execution of an instruction. When it is addressed over the bus width, which is the same as a word bound and is 16 bits×4 in this embodiment, connecting the code ROM 12 and the control unit 10 as, for example, the instruction code IC(n+1), the instruction had not be fetched and stored in the fetch registers FR0 to FR2 in one clock. For solving this problem, the conventional method has been employed to load instructions in register called code queue (prefetch buffer or prefetch register) prior to execution of an instruction. However, this solution poses the problem that if the prefetch buffer flushes upon occurrence of a prefetch pointer action or a branch instruction, the process is substantially suspended until the instruction code to be executed after branching is loaded. A method of predecoder or a delayed branching may be a solution for this problem. However, these methods require additional control different from the normal prefetch operation, and at least the prefetch register or the like is indispensable, resulting in further increased circuit size.

For this reason, in the control unit 10 of this embodiment, the fetch addresses FA and NA for two lines are always output from the fetch address output unit 41 of the fetch unit 21. This makes possible to always fetch even an instruction code stored over the word boundary in one clock. Further, according to this embodiment, each instruction code has an instruction length code 52, and therefore the head address of the succeeding instruction code can be determined without delay. Further, the maximum instruction length has 3 words that are shorter than the bus width, i.e. the word boundary. Therefore, the code of the 3 words for the succeeding instruction is always fetched from the head address and stored in the fetch register regardless of whether or not the instruction code is on the word boundary.

Figure 5:
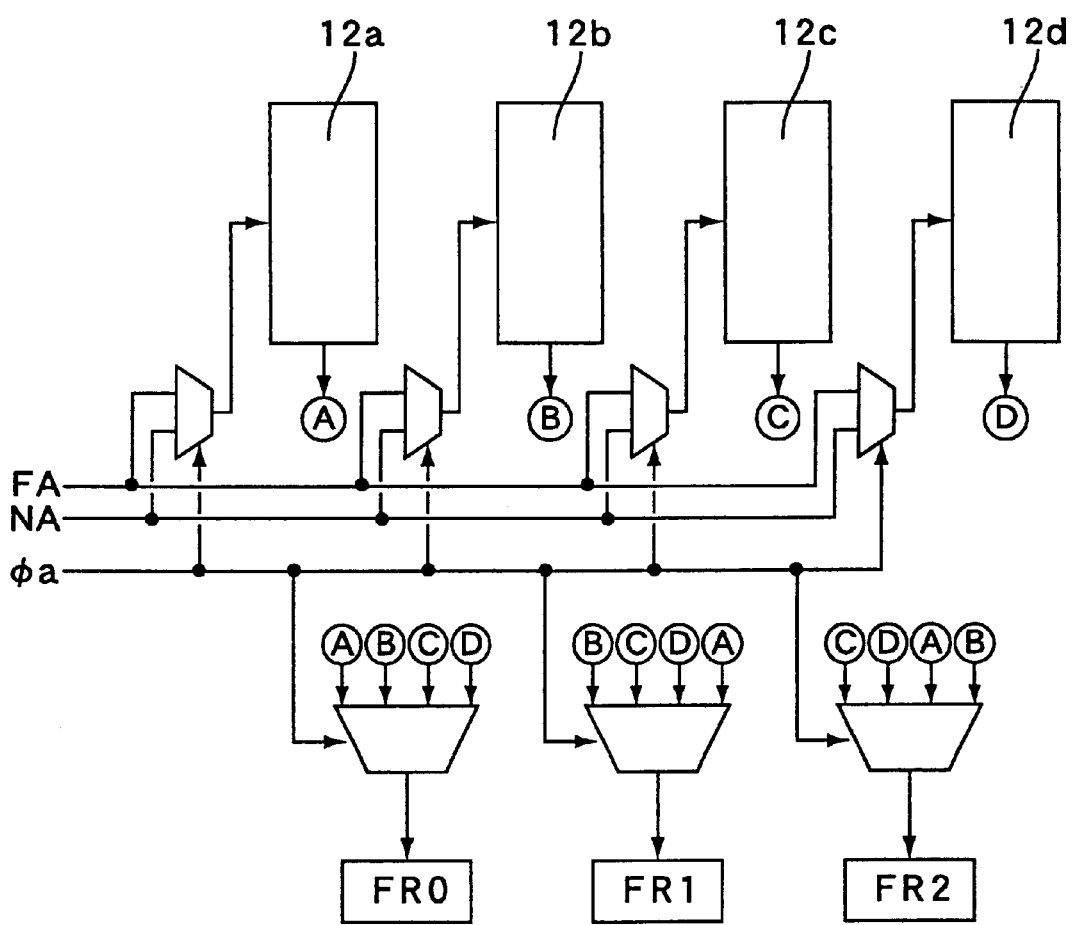
FIG. 5 is a diagram showing an example configuration for fetching the instruction code from the code ROM.

FIG. 5 shows a circuit example for performing such a control. The instruction code is interleaved and stored among four code ROMs 12a, 12b, 12c and 12d for each word, and the two-line addresses FA and NA are selected for each code ROM by the signal φa from the fetch address output unit 41 based on the result of decoding the instruction length code 52. Further, the data outputs A, B, C and D fetched by the respective buses from the code ROMs 12a, 12b, 12c and 12d are selected based on the selection signal φa and stored in the fetch registers FR0, FR1 and FR2 respectively. Thus, the 3-word data from the head address indicated by the program counter IP are always stored in the fetch registers FR0 to FR2. Thus, in spite of the fact that the instruction code has a variable length, a prefetch register is not required. Also, an instruction code arranged over the word boundary is fetched in one clock by the normal fetch operation, even if branching is executed. In this way, the high-speed execution can be guaranteed without penalty resulting from the fetch operation.

This fetch process is not limited to the instruction code having a maximum length of 3 words, but is also applicable to the maximum length of 4 or more words. For 5 words or more, however, the word boundary in the code ROM in which the instruction code is aligned or the code RAM into which it is downloaded must be equal or larger than the maximum length of the instruction code.

Now, the other architecture for improving the real time response in this control unit 10 will be explained. In the control unit according to this embodiment, it is important to completely execute all the instructions within one clock as described above. For this purpose, the control unit 10 is so configured that the call instruction, the return instruction, the stack operation for branching and return upon interrupt handling, etc. can also be executed within one clock. In the prior art, when returning after the occurrence of a call instruction, a return instruction or an interrupt, the return address stored in the stack is used. Since the return address is stored in the stack (memory) as described above, in the return process, at least one clock is required for acquiring the return address, and another clock is required for outputting the return address. Therefore, at least two clocks are required for the return process.

In the control unit 10 according to this embodiment, an identical pointer for managing the return address and a temporary register TR are independently provided in the execution unit 36 of the PU 32, and managed by a register management function 39, thus avoiding the problem. Specifically, the return address, when stored in the stack, is stored also in the temporary register TR as the latest information. As a result, the process for returning to the address stored in the temporary register TR can be executed by the fetch control unit 44 supplying the address of the temporary register TR to the fetch address output unit 41 and executing it. Therefore any address need not be loaded from the stack and the return process can be executed in one clock. Further, when the return process consumes the address of the temporary register TR, the next return address data is loaded in the temporary register. Thus, the next return process is also performed within one clock.

Further, the interrupt process requires flag information (condition code) CC in addition to the return address IP. The register management function 39 according to this embodiment prepares two separate temporary registers TR for these information IP and CC, respectively, and two addresses are output to the stack such that the data of IP and CC will be read and written independently.

Figure 6:
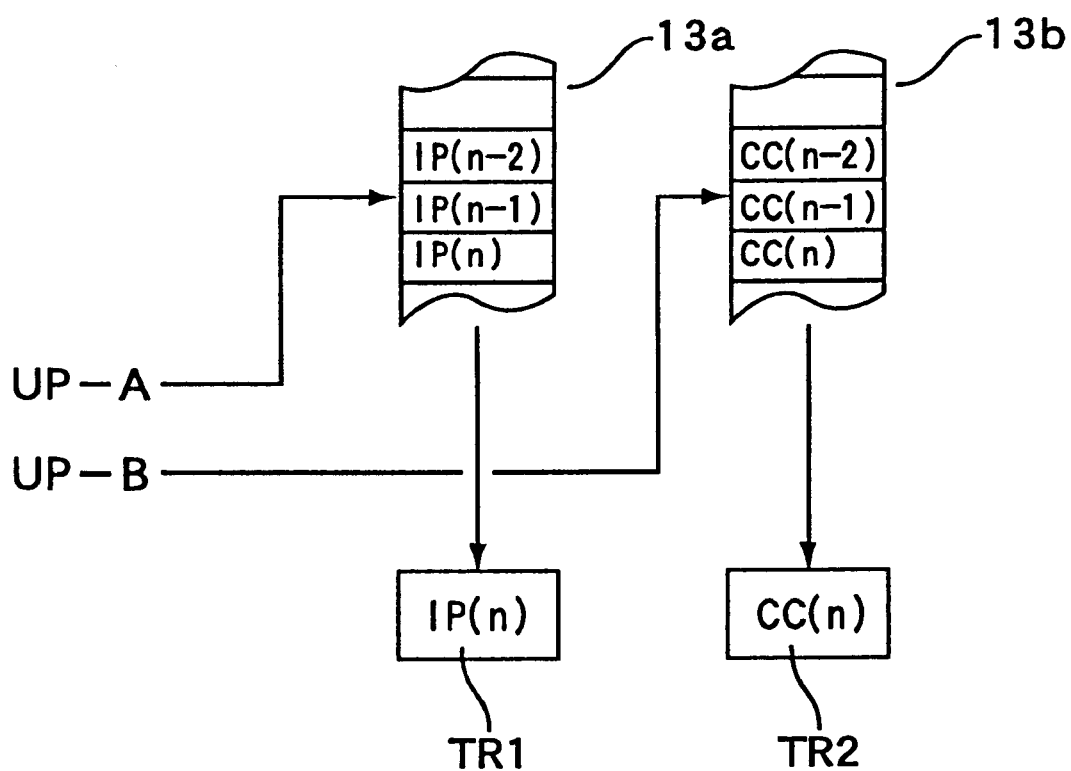
FIG. 6 is a diagram showing a model of controlling a temporary register.

FIG. 6 shows a diagram showing the processing relating to the interrupt return in the register management function 39 of this embodiment. The interrupt return address IP and the flag information CC are sequentially stacked in the stack areas 13a and 13b of the work RAM 13. Upon execution of the interrupt instruction, the return address IP(n) and the flag information CC(n) associated with the interrupt instruction are recorded in the stack areas 13a and 13b of the RAM 13 while at the same time being stored in the corresponding temporary registers TR1 and TR2, respectively. Assuming that the return process is performed in this stage, the return address IP(n) and the flag information CC(n) stored in the temporary registers TR1 and TR2 are used by the fetch unit 21, thus allowing the return process within one clock.

At the same time, the address data of the return address IP(n−1) and the flag information CC(n−1) subsequent to the stack areas 13a and 13b (for the previous interrupt at the elapse of time) are output as the addresses UP-A and UP-B for access to the stacks 13a and 13b. Thus, the return address IP(n−1) and the flag information CC (n−1) are output on the memory data bus. Therefore, the next return address IP(n−1) and the flag information CC(n−1) output on the bus are loaded (stored) in the temporary registers TR1 and TR2 upon return to the return address IP(n), specifically, at the timing of the rise or fall of the next clock. Even when the process for returning to the return address IP(n−1) occurs in the next clock, the return process is executed in one clock using the data in the temporary registers TR1 and TR2. The return process for other instructions such as a branch instruction or a call instruction as well as the interrupt instruction can also be completed in one clock by a similar method. By storing the return address and the flag information as a double-word data in the stack area, the addresses for accessing the stack area for return from the interrupt process can be unified.

In the control unit 10 of this embodiment, the register management function capable of executing the control operation described above is provided in the PU 32 and it makes possible to execute the return process of the branch instruction, the conditional branch, the subroutine call and the interrupt process in one clock. Therefore, even in the real time processing required to be executed in units of a clock, an efficient microprogram can be used and a real time control can be performed with a highly productive programming.

As is explained, the data processing system 1 of this embodiment executes accurate real time control in a clock basis, and while guaranteeing the programmability, can realize the high-speed decoding of the MPEG bit stream under the control of microprogram with high parallelism unlike the conventional system with only special purpose circuits. Further, the process can be accurately defined in a unit of a clock, and the general purpose process such as the error processing or the interrupt processing can be executed in parallel with the special purpose instruction. In addition, the problem of synchronizing is completely overcome at the instruction code level and therefore the communication circuit for the synchronizing control is eliminated. Also, there is no need of providing circuit which might be overlapped. Thus, this invention realizes a substantially inexpensive, compact data processing unit.

It will be obvious that the control unit having the architecture according to the invention described above is not limited to the VLD but is applicable very effectively to the other data processing system requiring an accurate real time control and a larger throughput such as network control unit, etc. In spite of the control by a microprogram having general purpose data processing instructions capable of multiprogramming, it is possible to provide the process of the same quality as the control by an identical state machine. Thus, it will be possible to apply the control unit of the present invention to all the fields that the conventional special purposes and/or identical state machine has been applied.

As described above, the control unit with microcode according to the present invention has at least one special purpose data processing unit and a general purpose data processing unit, to which the special purpose instruction and the general purpose instruction in microcode are supplied by a common fetch unit. Therefore, the special purpose data processing unit and the general purpose data processing unit are controlled synchronously at the instruction code level, such that the multiprocessing in these units is possible without increasing the circuit size. Thus, a high-speed control unit and a data processing system using such a control unit are provided which are suitable for the processing requiring real time control and have a high cost performance including the development cost.

Further, this invention discloses several configurations and architectures for realizing the accurate real time control in units of one clock and are applicable to a variety of fields requiring a large throughput and a real time control, for example, decoders, encoders, communication systems, data processing systems, and microprocessors or digital signal processors having execution functions of both the special purpose instruction and the user definition instruction.

Furthermore, the present invention is applicable to the FPGA, the gate array, the embedded array, the standard cell base LSI and the full custom base LSI, these are intended to achieve a high-speed processing in software.

Various other modifications will be apparent to and can be readily made by those skilled in the art without departing from the scope and spirit of this invention.

What is claimed is:

1. A control unit comprising:
    at least one special purpose data processing unit which is able to decode and execute special purpose instructions to a special purpose circuit suitable for specific data processing;
    a general purpose data processing unit which is able to decode and execute general purpose instructions for performing the process other than the special purpose instructions; and
    a fetch unit for fetching instruction code from a code memory that stores the special purpose instructions and the general purpose instructions in microcode and for supplying the instruction code to said special purpose data processing unit and said general purpose data processing unit.

2. A control unit according to claim 1, wherein the instruction code includes identifier code capable of identifying the special purpose instructions, the general purpose instructions, and a given special purpose instruction issued to a specific special purpose data processing unit, if any; and
    said fetch unit includes an execution control unit for decoding the identifier code and directing said general purpose data processing unit or said special purpose data processing unit to perform decode and execution.

3. A control unit according to claim 1, further comprising a plurality of special purpose data processing units, and wherein the instruction code includes a parallel processing flag indicating that the succeeding instruction code is able to be processed in parallel in any one of said special purpose data processing units or said general purpose data processing unit; and
    said fetch unit further includes an execution control unit for directing any one of said special purpose data processing units or said general purpose data processing unit to decode and execute the succeeding instruction code based on the parallel processing flag of the instruction code.

4. A control unit according to claim 1 further comprises execution register for the at least any one special purpose data processing unit or said general purpose data processing unit, and wherein,
    said fetch unit further includes a fetch data output unit for storing said instruction code in the execution register while at the same time fetching a succeeding instruction code.

5. A control unit according to claim 1 further comprises execution register for said special purpose data processing unit, and wherein,
    said fetch unit further includes a fetch data output unit for storing said instruction code in the execution register while at a same time fetching the succeeding instruction code.

6. A control unit according to claim 1, further comprising a plurality of special purpose data processing units, and wherein the instruction code includes a parallel processing flag indicating that the succeeding instruction code is able to be processed in parallel in any one of said special purpose data processing units or said general purpose data processing unit; and said fetch unit further includes:
    a fetch data output unit for storing said instruction code in execution register of at least any one of said special purpose data processing units or said general purpose data processing unit while at the same time fetching the succeeding instruction code, and
    an execution control unit for directing any one of said special purpose data processing units or said general purpose data processing unit to decode and execute the succeeding instruction code based on the parallel processing flag of the instruction code.

7. A control unit according to claim 1, wherein the instruction code has an instruction length code indicating the word length of an instruction code itself, and
    said fetch unit further includes a fetch data output unit for fetching the microcode corresponding to a maximum instruction length subsequent to the instruction code as a succeeding instruction code.

8. A control unit according to claim 7, wherein said fetch unit further includes a fetch address output unit for outputting instruction fetch addresses of two lines.

9. A control unit according to claim 1, further comprising a temporary register and wherein said fetch unit comprises:
    a fetch address output unit for outputting an instruction fetch address, and
    a fetch control unit capable of supplying return address stored in the temporary register to said fetch address output unit, and wherein:
        said general purpose data processing unit has a register management function for storing the return address in a memory and said temporary register when executing a branch instruction or an interrupt instruction, and loading a next return address from said memory into said temporary register when executing return processing.

10. A control unit according to claim 9, wherein said register management function respectively stores the interrupt return address and condition code in said memory and also in the temporary register for the interrupt return address and condition code when executing an interrupt instruction, outputs a memory address of the return address and the memory address of the condition code when executing the return processing, and loads the next return address and next condition code from said memory into said temporary register, respectively.

11. A data processing system comprising the control unit according to claim 1 and at least one special purpose circuit controllable by said control unit.

12. A data processing system according to claim 11, wherein the one of special purpose circuit is a circuit for detecting a start code from an encoded data stream or a circuit for continuously decoding a variable-length coded data.

13. A memory device storing instruction code for the control unit according to claim 1, wherein the instruction code includes identifier code capable of identifying the special purpose instructions, the general purpose instructions, and a given special purpose instruction issued to said special purpose data processing unit.

14. A memory device according to claim 13, further comprising a plurality of special purpose data processing units, and wherein the instruction code further includes a parallel processing flag indicating that the succeeding instruction code is able to be processed in parallel in any one of said special purpose data processing units or said general purpose data processing unit.

15. A memory device according to claim 14, wherein the instruction code further includes an instruction length code indicating a length of the instruction code itself.

16. A control method for the control unit according to claim 1, wherein the instruction code includes identifier code capable of identifying the special purpose instructions, the general purpose instructions, and a given special purpose instruction issued to a specific one of a plurality of said special purpose data processing units, if any; and said control method comprises a process of decoding the identifier code and directing said general purpose data processing unit or any one of said special purpose data processing units to perform decode and execution.

17. A control method according to claim 16, further comprising a plurality of special purpose data processing units, and wherein the instruction code includes a parallel processing flag indicating that the succeeding instruction code is able to be processed in parallel in any one of said special purpose data processing units or said general purpose data processing unit; and said control method further comprises a process of directing any one of said special purpose data processing units or said general purpose data processing unit to decode and execute the succeeding instruction code based on the parallel processing flag of the instruction code.

18. A control method according to claim 17, wherein said control unit further comprises execution register for at least any one of said special purpose data processing units or said general purpose data processing unit, and wherein, said control method further comprises a process of storing said instruction code in the execution register while at the same time fetching the succeeding instruction code, and a process of directing any one of said special purpose data processing units or said general purpose data processing unit to decode and execute the succeeding instruction code based on the parallel processing flag of the instruction code.

19. A control method according to claim 16, wherein the instruction code has instruction length code indicating a word length of the instruction code itself, and said control method further comprises a process of fetching the microcode corresponding to a maximum instruction length subsequent to the instruction code as a succeeding instruction code.

20. A control method according to claim 16, further comprises:

a process of outputting an instruction fetch address from return address stored in a temporary register;

a process of storing the return address in a memory and said temporary register when executing a branch instruction or an interrupt instruction; and a process of loading a next return address from said memory into said temporary register when executing return processing.

21. A control unit comprising:

at least one special purpose data processing unit which is able to decode and execute special purpose instructions to a special purpose circuit suitable for specific data processing;

a general purpose data processing unit which is able to decode and execute general purpose instructions for performing the process other than the special purpose instructions;

a code memory for storing the special purpose instructions and the general purpose instructions in microcode; and a fetch unit for fetching instruction code from the code memory that stores the special purpose instructions and the general purpose instructions in microcode and for supplying the instruction code to said special purpose data processing unit and said general purpose data processing unit.

22. A control unit according to claim 21, wherein the instruction code includes identifier code capable of identifying the special purpose instructions, the general purpose instructions, and a given special purpose instruction issued to said special purpose data processing unit, if any; and said fetch unit includes an execution control unit for decoding the identifier code and directing said general purpose data processing unit or said special purpose data processing unit to perform decode and execution.

* * * * *